Patented Mar. 25, 1952

2,590,474

UNITED STATES PATENT OFFICE 2,590,474

MOLYBDENUM-CONTAINING FERTILIZER

Albert Leeds Stillman, Plainfield, N. J., assignor to Fuel Research Corporation, New York, N. Y., a corporation of Delaware No Drawing. Application November 26, 1948, Serial No. 62,238

9 Claims. (Cl. 71—44)

This invention has for its primary purpose the provision of an improved coal ash fertilizer and it consists in the process of manufacturing the same and the resultant products.

Ordinarily, hard coal ashes are utilized in connection with heavy, stiff soils to make them more friable and to improve their drainage conditions. The ashes of the softer coals however, are not believed to be satisfactory for this purpose because of the presence therein of large amounts of clinker or slag. From the fertilizer standpoint, nearly all coal ashes are unsatisfactory because the amounts of plant food or ingredients for enhancing plant growth contained therein are insignificant. Due to these factors, the ashes of bituminous and semi-bituminous coals are seldom employed in the development of the soil, while hard coal ashes are often used but merely from the standpoint of conditioning the soil and not as a fertilizer. The value of a fertilizer, as is well known, depends upon its ability to improve the quality or increase the size or yield of plants. Two of the most valuable ingredients in fertilizers are phosphate and potash because the former stimulates root growth and hastens maturity, while the latter is necessary to healthy plant growth. Both however, must be in the form of a soil soluble compound if they are to be valuable as fertilizers. The soil soluble compounds of these two ingredients are not readily available in sufficient quantities as a natural product and it is usually necessary from a commercial standpoint to process the insoluble phosphate or potash bearing rock so as to convert the phosphate and potash to soil soluble compounds of these ingredients. In recent years it has been found that additions of molybdenum oxide, or sodium molybdate is of advantage in the growth of plants, especially leguminous plants. When added alone to the soil in extremely small quantities, the molybdenum increases the availability of nitrogen to a growing crop and when soluble phosphates are added, the availability of the phosphate to the crop is likewise increased. The same is believed to be true in the case of potash fertilizers.

I have found that if either insoluble phosphate rock or insoluble potash bearing rock are added to coal, either a hard, bituminous or semi-bituminous coal, and the latter is burned at ordinary combustion temperatures, it is possible, if a molybdenum salt be present as a catalyst, to provide a fertilizer in which the phosphate and potash will be present in the form of soil soluble compounds and the coal ash instead of containing a large amount of slag or clinker will be in a form in which it can readily improve the texture and workability of the soil and give it better moisture absorption. I am aware that it has heretofore been proposed to make soil soluble phosphoric compounds out of insoluble phosphate rock through heat. Such prior procedure however, involved the use of a high heat and blast, as in a carbon blast furnace, in order to vaporize the soluble phosphates which were afterward collected in a suitable concentrator. I have also made many trials burning coal with insoluble phosphate or potash rock, but without the molybdenum compound being present, and have never found anything of value in the coal. In was only when the molybdenum compound was present in the coal during the combustion period, that I was enabled to obtain ash having valuable fertilizer properties.

While in the carrying out of my invention any hard, bituminous or semi-bituminous coal may be used to advantage, I prefer to use coals having a high iron content and low slagging temperature. Thus, in an illustrative example of one method of practicing my invention, I shall use as the starting material a bituminous coal such as an Upper Kittaning coal or No. 6 Illinois seam coil. Such coals usually contain over one percent of sulphur and when burned, usually leave an ash containing brown slag or clinker which is thickly studded with particles of unburned coke. To one ton of a coal of the indicated type, I add two ounces of molybdenum oxide, ten pounds of leucite, four pounds of common salt and twenty pounds of phosphate rock. The coal with the ingredients added is then burned at ordinary combustion temperatures of from 1800 degrees F. to 2600 degrees F. During the burning process it is believed that the molybdenum acts as a catalyst to convert the phosphate rock into lime and superphosphate, utilizing the steam generated in the coal by the burning process. The molybdenum is believed to also act as a catalyst to cause the leucite and salt to interact to produce a soil soluble potash. Further, the molybdenum is believed to raise the fusion point of the ash and thereby eliminate the usual formation of clinker or slag during the burning process. As a result of the burning process, there will be left a residue composed of approximately 110 pounds of ash, one ounce of molybdenum oxide, ten pounds of phosphate and five pounds of potash.

The ash in the residue contains no clinker or slag, is grey in color instead of brown and contains much less unconsumed carbon than the ash from the untreated coal. In this latter connection, it is believed that the potash and phosphate also interact with the coal to minimize the possibility of any unconsumed carbon appearing in the ash. The ash is in a fluffy, powdery condition, much more friable and porous than the ash of an untreated coal, and in its original composition as a product of combustion, is valuable for conditioning the soil to improve its qualities for plant growth. The phosphate and potash in the ash is substantially wholly in a soil soluble state which makes them readily available for the use of the plants. The molybdenum remains in sufficient quantity in the ash to increase the availability of the phosphate and potash to a growing crop.

While molybdenum oxide is used as a starting material in the foregoing example, it will be understood that the invention can be practiced using molybdenum sulphide or any other of the salts of molybdenum which will as a result of the burning process, provide the desired content of molybdenum oxide to accomplish the purposes of the invention. In this latter connection, I have found that when the amount of molybdenum oxide in the burning coal is less than one-half ounce per ton of coal, slag or clinker forms to the same extent as in ordinary burning of the coal with such oxide not present. On the other hand, I have found that when the molybdenum oxide is present in the coal in an amount greater than three ounces per ton of coal, the effectiveness of such oxide is apparently overcome and a slag condition much worse and more dangerous occurs; the slag resulting from such excess of the oxide being stronger and harder to break up than slag formed under ordinary conditions without the molybdenum oxide. Accordingly, I have found that in order to successfully practice this invention, the amount of molybdenum oxide in the coal should not be less than one-half ounce, nor more than three ounces per ton of coal. Preferably, as in the given example, I use two ounces of molybdenum oxide per ton of coal, as such an amount will provide in the ash a molybdenum oxide content of approximately one-tenth of one percent, which content I have found most desirable in the use of the ash as a fertilizer.

Other forms of potash containing substances may be used instead of leucite, such as for example, a potash containing feldspar (orthoclase) or a potash containing silicate of the type known as New Jersey marl. The potash containing substance should be added to the coal in such quantity as will provide in the resultant ash the amount of soil soluble potash which is best suited for the purposes for which the ash is to be used as a fertilizer. For most purposes, the soil soluble potash in the ash should not be less than about two percent nor more than about eight percent of the ash. The amount of phosphate rock to be added to the coal may also be varied to obtain in the ash from three percent to eight percent of soil soluble phosphate. In regard to the potash containing substance and the phosphate rock, I have also found that when either of these materials are added to the coal in an amount greater than that required to provide eight percent of the soil soluble form thereof in the ash, the molybdenum oxide will not be effective to provide a greater percentage of such soluble substance and the remainder of the material will appear in the ash in an inert form. This however, is not disadvantageous, because any insoluble phosphate or potash appearing in the ash will in time in the soil, be converted by the molybdenum oxide to a soil soluble condition. There will be thus made available by the action of the molybdenum oxide on the insoluble phosphate or potash in the soil, a continuing supply of soil soluble phosphate or potash after the original amount thereof in the ash has been utilized by the plants.

The product resulting from the aforesaid combustion process as has been indicated, may be taken directly from the grate and utilized as a fertilizer, or it may be first ground and/or intermixed to insure a homogenous mixture of the several ingredients before utilizing it as a fertilizer. For the reasons previously mentioned, it will be at once apparent that the resulting product is not only a valuable fertilizer, but is also valuable as a soil conditioner, results which have never heretofore been attained from coal of the indicated type, so far as I am aware. It will be understood also from the foregoing, that in the manufacture of my improved fertilizer, any form of molybdenum may be employed that will be reduced to the oxide form as a result of the burning process and that whether utilized alone, or with the phosphate or potash or both, it will produce a valuable fertilizer. I have found however, that it is necessary to include the molybdenum as an ingredient if either the insoluble phosphate or potash rock is to be included with the coal in order to attain a valuable fertilizer.

I claim:

1. The herein described process of making fertilizer comprising adding to a ton of coal an amount of molybdenum compound such as to provide between one-half to three ounces of molybdenum oxide, and a member of the group consisting of insoluble phosphate rock and insoluble potash bearing rock, and mixtures thereof then burning the mixture at ordinary combustion temperatures to convert the same to ash, and then subjecting the resultant ash to a homogenizing step.

2. The herein described process of making fertilizer comprising adding to coal, an amount of molybdenum compound such as to provide between one half to three ounces of molybdenum oxide per ton of coal and a member of the group consisting of insoluble phosphate rock and insoluble potash bearing rock, and mixtures thereof, then burning the mixture at ordinary combustion temperatures to convert same to ash, and utilizing such ash as fertilizer.

3. The herein described process of making fertilizer comprising adding to a ton of coal an amount of molybdenum compound such as to provide between one-half to three ounces of molybdenum oxide, a sufficient amount of an insoluble potash containing substance to give from two percent to eight percent of soil soluble potash in the resultant ash, and a sufficient amount of insoluble phosphate rock to give from three percent to eight percent of soil soluble phosphate in the resultant ash, then burning the mixture at temperatures from 1800 degrees F. to 2600 degrees F. to convert the same to ash, and utilizing such ash as fertilizer.

4. The herein described fertilizer obtained by subjecting a mixture of coal, molybdenum compound in such amount as to provide between one-half to three ounces of molybdenum oxide per ton of the coal burned and a member of the group consisting of insoluble phosphate compound and insoluble potash compound and mixtures thereof, to burning at ordinary combustion temperatures to convert substantially all the coal into inert coal ash and to convert the major portion at least of said insoluble material into a member of the group consisting of citrate-soluble phosphate compound and citrate-soluble potash compound, and mixtures thereof, and then intermixing the ingredients resulting from such burning to provide a homogeneous mixture.

5. The herein described fertilizer obtained by subjecting a mixture of coal, molybdenum compound in such amount to provide between one-half to three ounces of molybdenum oxide per ton of the coal burned and a member of the group consisting of insoluble phosphate compound and insoluble potash compound and mixtures thereof, to burning at ordinary combustion temperatures to convert substantially all the coal into inert coal ash and to convert the major portion at least of said insoluble material into a member of the group consisting of soil soluble phosphate compound and soil soluble potash compound, and mixtures thereof, the ingredients being retained in the natural combination resulting from such combustion.

6. The herein described fertilizer obtained by subjecting a mixture of coal, molybdenum compound in such amount to provide between one-half to three ounces of molybdenum oxide per ton of the coal burned and insoluble potash compound, to burning at ordinary combustion temperatures to convert substantially all the coal into inert coal ash and to convert the major portion at least of said insoluble potash into soil soluble potash, the soil soluble potash constituting of from two percent to eight percent, by weight, of the ash product resulting from such combustion.

7. The herein described fertilizer obtained by subjecting a mixture of coal, molybdenum compound in such amount as to provide between one-half to three ounces of molybdenum oxide per ton of the coal burned and insoluble phosphate compound, to burning at ordinary combustion temperatures to convert substantially all the coal into inert coal ash and to convert the major portion at least of said insoluble phosphate into soil soluble phosphate, the soil soluble phosphate constituting of from three percent to eight percent, by weight, of the ash product resulting from such combustion.

8. The herein described fertilizer obtained by subjecting a mixture of coal, molybdenum compound in such amount as to provide between one-half to three ounces of molybdenum oxide per ton of the coal burned, insoluble potash compound and insoluble phosphate compound, to burning at ordinary combustion temperatures to convert substantially all the coal into inert coal ash and to convert the major portion at least of the insoluble potash and insoluble phosphate into soil soluble potash and soil soluble phosphate, respectively, the soil soluble potash constituting of from two percent to eight percent, by weight, of the ash product resulting from such combination, and the soil soluble phosphate constituting from three percent to eight percent, by weight, of such ash product.

9. The herein described fertilizer obtained by subjecting a mixture of coal, molybdenum oxide, insoluble potash compound and insoluble phosphate compound to burning at ordinary combustion temperatures to convert the coal into coal ash and the insoluble potash and phosphate into soil soluble potash and soil soluble phosphate, respectively, the ash product resulting from such combustion containing the ingredients in substantially the proportions of approximately 110 pounds of coal ash, approximately one ounce of molybdenum oxide, from 2.2 to 8.8 pounds of soil soluble potash and from 3.3 to 8.8 pounds of soil soluble phosphate.

ALBERT LEEDS STILLMAN.

REFERENCES CITED

The following references are of record in the file of this patent:

UNITED STATES PATENTS

| Number | Name | Date |
|---|---|---|
| 241,868 | Liebig | May 24, 1881 |
| 1,032,763 | Newberry et al. | July 16, 1912 |
| 1,163,130 | Connor | Dec. 7, 1915 |
| 1,236,812 | Zilk | Aug. 14, 1917 |
| 1,247,059 | Zilk | Nov. 20, 1917 |
| 1,283,677 | Connor | Nov. 5, 1918 |
| 1,366,569 | Kreiss | Jan. 25, 1921 |
| 1,409,126 | Free | Mar. 7, 1922 |
| 1,917,680 | Witt | July 11, 1933 |
| 2,310,652 | Peter | Feb. 9, 1943 |